United States Patent
Ryu et al.

(10) Patent No.: US 7,782,030 B2
(45) Date of Patent: Aug. 24, 2010

(54) STEP-DOWN CONVERTER

(75) Inventors: Takashi Ryu, Kyoto (JP); Takuya Ishii, Osaka (JP); Naoyuki Nakamura, Kyoto (JP); Hirohisa Tanabe, Kyoto (JP)

(73) Assignee: Panasonic Corporation, Osaka (JP)

( * ) Notice: Subject to any disclaimer, the term of this patent is extended or adjusted under 35 U.S.C. 154(b) by 471 days.

(21) Appl. No.: 11/783,645

(22) Filed: Apr. 11, 2007

(65) Prior Publication Data

US 2007/0241725 A1    Oct. 18, 2007

(30) Foreign Application Priority Data

Apr. 18, 2006    (JP)    ............................. 2006-114622

(51) Int. Cl.
   *G05F 1/00* (2006.01)
(52) U.S. Cl. ........................................... 323/268
(58) Field of Classification Search ................ 323/222, 323/268
   See application file for complete search history.

(56) References Cited

U.S. PATENT DOCUMENTS

| | | | | |
|---|---|---|---|---|
| 5,734,256 A | * | 3/1998 | Larsen et al. | ............... 323/207 |
| 5,912,552 A | * | 6/1999 | Tateishi | ....................... 323/285 |
| 6,163,712 A | * | 12/2000 | Winkler et al. | .............. 455/572 |
| 6,229,289 B1 | * | 5/2001 | Piovaccari et al. | .......... 323/268 |
| 2004/0113599 A1 | * | 6/2004 | Kojima et al. | ................ 323/284 |
| 2005/0007077 A1 | * | 1/2005 | Loechner | ..................... 323/222 |
| 2005/0242792 A1 | * | 11/2005 | Zinn | ........................... 323/268 |
| 2006/0006850 A1 | * | 1/2006 | Inoue et al. | .................. 323/265 |
| 2007/0279024 A1 | * | 12/2007 | Falvey et al. | ................. 323/280 |

FOREIGN PATENT DOCUMENTS

| | | |
|---|---|---|
| JP | 63-74077 U | 5/1988 |
| JP | 2000-58344 A | 2/2000 |

\* cited by examiner

*Primary Examiner*—Bao Q Vu
*Assistant Examiner*—Jue Zhang
(74) *Attorney, Agent, or Firm*—McDermott Will & Emery LLP

(57) ABSTRACT

The step-down converter includes: a switch; an inductor; a rectifier; a smoothing unit; and a current bypass circuit, wherein when the current flowing toward the inductor exceeds a predetermined value, the current bypass circuit forms a path through which the current flows from the input terminal to the output terminal while bypassing the inductor.

3 Claims, 3 Drawing Sheets

STEP-DOWN CONVERTER

BACKGROUND OF THE INVENTION

1. Field of the Invention

The present invention relates to a power supply circuit for supplying a direct-current voltage to various electronic apparatuses. Specifically, the present invention relates to a step-down DC-DC converter adopting a switching system.

2. Description of the Prior Art

In recent years, step-down DC-DC converters adopting a switching system (hereinafter, referred to as step-down converters) are used as power supply circuits for many electronic equipments because the step-down converters have high efficient power conversion characteristics. Especially in portable devices, typically a mobile phone, there is a demand for miniaturization, and at the same time, it is strongly demanded to realize large power as the equipments become more sophisticated in functionality. Although the power supplied to a load is relatively small in normal operation, there may be a case where a large current has to be supplied to the load only for a short time, which can be almost an instant. The step-down converter includes an inductor as a main component which is responsible for power conversion. When the inductor reaches magnetic saturation due to the large current, inductance rapidly reduces. As a result, the inductor can not serve as a current-limiting element any more to control a current, which damages a switching element and other components. Meanwhile, in order to prevent the inductor from reaching the magnetic saturation due to the large current, it is required to increase a sectional area of a magnetic core, which increases inductor size.

As an example of inductor used for such a step-down converter, an inductor shown in FIG. 4 has been proposed (for example, see Japanese Laid-Open Patent Publication No. 2000-58344). As illustrated with the inductor of FIG. 4, disclosed herein is such a configuration that the inductor includes: a first core 61 formed of a material which has a high magnetic saturation region and thus hardly reaches the magnetic saturation; a second core 62 formed of a material which has a low magnetic saturation region but has a higher magnetic permeability, the second core 62 being provided in parallel to the first core 61; and a coil 63 which winds on the first core 61 and the second core 62. In this configuration, if a current flowing through the inductor is small, the value of a combined inductance of the inductor increases. Meanwhile, if the current flowing through the inductor is large, the second core 62 reaches the magnetic saturation but the first core 61 does not reach the magnetic saturation, which reduces the combined inductance.

As mentioned in Description of the Prior Art, in the method of structuring the inductor to deal with the large current, the inductance reduces on the occasion of the large current. Therefore, the amplitude of the current flowing through the inductor increases, which increases a ripple voltage superimposed on an output voltage of the step-down converter. Moreover, the size of the inductor increases and the price of the inductor rises.

SUMMARY OF THE INVENTION

In view of the above-mentioned problems, an object of the present invention is to provide a step-down converter which is possible to supply a large current to an output without causing magnetic saturation.

To achieve the above-mentioned object, a step-down converter of an aspect of the present invention includes: a switch to which an input voltage is supplied via an input terminal; an inductor which is connected to the switch; rectifier means which allows a current to flow through the inductor in the OFF state of the switch; smoothing means which smoothes the current of the inductor to produce an output voltage to an output terminal; and a current bypass circuit, wherein when the current flowing toward the inductor exceeds a predetermined value, the current bypass circuit forms a path through which the current flows from the input terminal to the output terminal while bypassing the inductor.

According to the step-down converter of the aspect of the present invention, when the current flowing toward the inductor exceeds the predetermined value, a path through which the current flows from the input terminal to the output terminal while bypassing the inductor is formed. As a result, the current flowing toward the inductor and exceeding the predetermined value is led to flow from the input terminal to the output terminal while bypassing the inductor. Therefore, it is possible to supply a large current to the output terminal, and at the same time, it is possible to prevent the inductor from reaching the magnetic saturation.

In the step-down converter of the aspect of the present invention, it is preferable that the current bypass circuit includes: a transistor which has one terminal connected between the switch and the input terminal and the other terminal connected between the inductor and the output terminal, an operation current of the transistor being controlled by a control signal; a current detection circuit which detects a current flowing toward the switch or the inductor to output a current detection signal; and a control circuit which outputs a control signal to increase an operating current of the transistor when a signal level of the current detection signal reaches a predetermined level. In this case, it is more preferable that the transistor is a PMOS transistor.

As described above, according to the present invention, if a current flowing toward the inductor is too large, the current is led to flow from the input terminal to the output terminal while bypassing the inductor. Therefore, it is possible to supply the large current to the output terminal, and at the same time, it is possible to prevent the inductor from reaching the magnetic saturation.

DESCRIPTION OF THE PREFERRED EMBODIMENTS

Embodiments of the present invention will be described below with reference to the drawings.

Embodiment 1

A step-down converter of Embodiment 1 of the present invention will be described below.

Figure 1A:
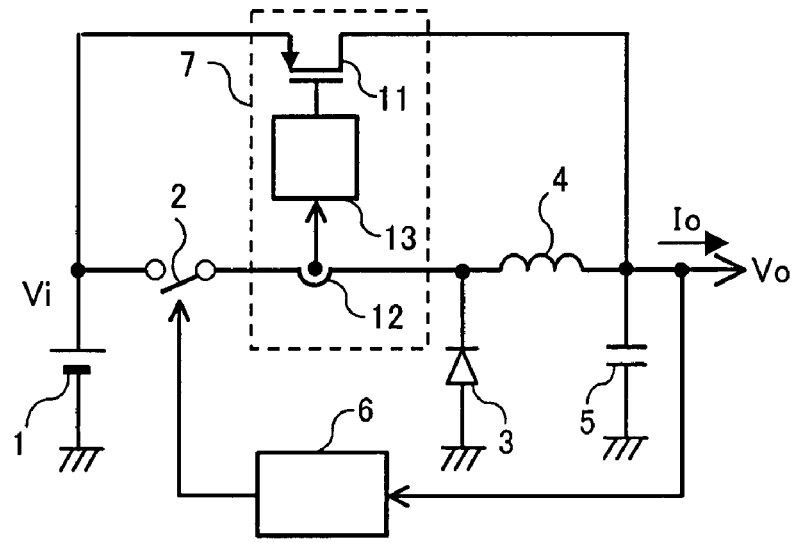
FIG. 1A is a diagram illustrating a circuit configuration of a step-down converter of Embodiment 1 of the present invention.

FIG. 1A is a diagram illustrating a circuit configuration of the step-down converter of Embodiment 1 of the present invention.

As shown in FIG. 1A, the step-down converter of Embodiment 1 of the present invention includes: a direct current input power supply 1, such as a battery, for supplying a direct current input voltage Vi; a switch 2 which has one terminal connected to the direct current input power supply 1; a diode (rectifier means) 3 which has a cathode connected to the other terminal of the switch and an anode connected to the ground; an inductor 4 which has one terminal connected to the other terminal of the switch 2 and which repeats accumulation and release of magnetic energy according to ON/OFF operation of the switch 2; an output capacitor (smoothing means) 5 which is connected to the other terminal of the inductor 4 and which smoothes a current flowing through the inductor 4 to supply an output direct current voltage Vo to a load (not shown) connected to the other terminal of the inductor 4; and a control circuit 6 which outputs a driving signal having an adjusted duty ratio $\delta$ to the switch 2 to turn on/off the switch 2 at a predetermined switching frequency such that the output voltage Vo stabilizes at a predetermined target value, the duty ratio $\delta$ representing a proportion of an ON period of the switch 2 with respect to one switching cycle.

The step-down converter of Embodiment 1 of the present invention further includes a current bypass circuit 7 forming a path through which a current flows from an input terminal to an output terminal while bypassing the inductor 4. Here, the current bypass circuit 7 includes: a PMOS transistor 11 which is connected between the direct current input power supply 1 and the other terminal of the inductor 4; a current detector 12 which is connected between the switch 2 and the one terminal of the inductor 4 and detects a current flowing toward the inductor 4; and a current control circuit 13 which receives a signal from the current detector 12 to output a driving signal to control an operating current of the PMOS transistor 11.

Figure 1B:
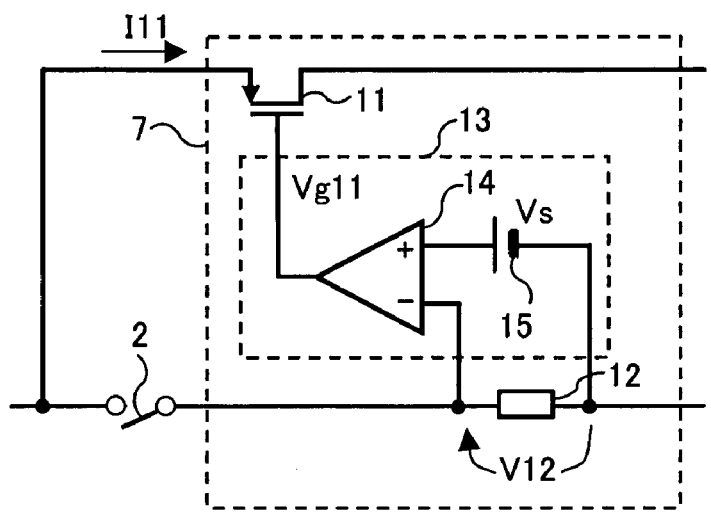
FIG. 1B is a diagram illustrating a circuit configuration of a current bypass circuit.

FIG. 1B is a diagram illustrating a specific circuit configuration of the current bypass circuit 7 of Embodiment 1 of the present invention.

As shown in FIG. 1B, the current detector 12 included in the current bypass circuit 7 is composed of a detection resistor. The current control circuit 13 included in the current bypass circuit 7 has a comparator 14 and a voltage source 15 for supplying a voltage Vs. The driving signal Vg11 from the comparator 14 is output to the PMOS transistor 11.

Operation of the step-down converter having the circuit configuration shown in FIG. 1A and FIG. 1B of Embodiment 1 of the present invention will be described below.

First, during the ON state of the switch 2, a difference voltage (Vi-Vo) between the input voltage and the output voltage is applied to the inductor 4, so that an increasing current flows into the inductor 4, allowing magnetic energy to accumulate in the inductor 4. The current flowing toward the inductor 4 is converted to a detection voltage V12 by the detection resistor 12. Then, the comparator 14 compares the predetermined voltage Vs output from the voltage source 15 with the detection voltage V12 and outputs a result of the comparison.

When the step-down converter is in normal operation in which an output current Io is not too large, the detection voltage V12 converted by the detection resistor 12 does not reach the predetermined voltage Vs. Therefore, the output from the comparator 14 is at an H level, and thus the transistor 11 is in the OFF state. When the switch 2 is turned off, a voltage of the inductor 4 is inverted, which brings the diode 3 into conduction. The output voltage Vo is applied to the inductor 4 in a direction opposite to a direction in the ON state of the switch 2, so that a decreasing current flows into the inductor 4, allowing the accumulated magnetic energy to be released. The above-mentioned operation is repeated to supply power from the direct current input power supply 1 to the output via the switch 2 and the inductor 4. Note that, the output voltage Vo is represented by the expression of Vo=$\delta \times$Vi, where $\delta$ is a duty ratio, and Vi is an input voltage. Since the current flowing through the inductor 4 is smoothed by the output capacitor 5, the output current Io has a mean value of the current flowing through the inductor 4.

Next, a description will be provided of operation in a case where a load temporarily and suddenly increases for any cause, that is, in a case where the output Io increases.

Figure 2:
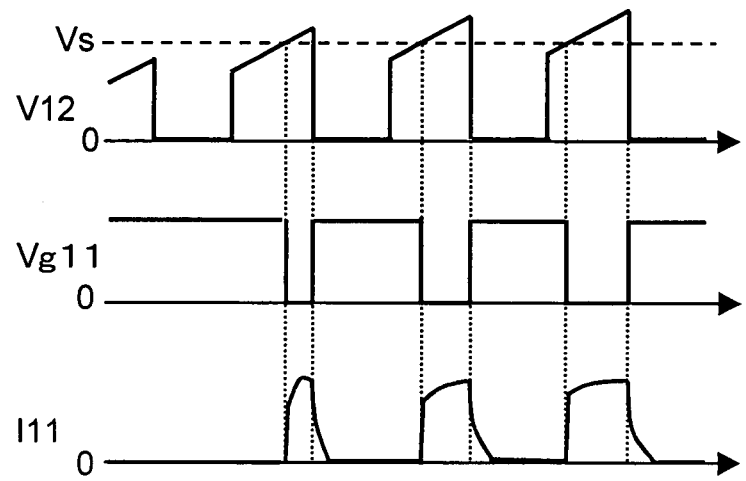
FIG. 2 is a chart illustrating operation waveforms of the step-down converter of Embodiment 1 of the present invention.

FIG. 2 is a chart illustrating operation waveforms in a case where the output current Io increases. Specifically, FIG. 2 shows the waveforms of the detection voltage V12, the predetermined voltage Vs, the output from the comparator 14, i.e., gate potential Vg11 of the transistor 11, and a current of the transistor 11, i.e., bypass current I11.

In the step-down converter, if the output current Io suddenly increases, the output current Io increases to a greater value than the mean value of the current flowing through the inductor 4. As a result, a balance between charge and discharge in the output capacitor 5 is destroyed, so that a discharged electrical charge increases, leading to a decrease in the output voltage Vo. The control circuit 6 detects the decrease in the output voltage Vo, and then operates to stabilize the output voltage Vo in such a manner that the control circuit 6 increases the duty ratio $\delta$ to increase an inductor current.

However, if an increasing amount of the output current Io is too large and the increased inductor current exceeds a predetermined value, the detection voltage V12 reaches the predetermined voltage Vs, so that the output Vg11 from the comparator 14 drops to an L level. This turns on the transistor 11, allowing the bypass current I11 to flow from the direct current input power supply 1 via the transistor 11 to the output while bypassing the inductor 4. Since the bypass current I11 charges the output capacitor 5 to increase the output voltage Vo, the control circuit 6 reduces the duty ratio $\delta$. As a result, the increase in the inductor current is suppressed.

A level of the output current Io at which the transistor 11 is switched to the ON state to conduct the bypass current I11 can be adjusted by a resistance value of the detection resistor 12 and the predetermined voltage Vs output from the voltage source 15. When the level of the output current Io limited in this way is set to a lower value than the allowable current value of the inductor 4, it is possible to supply a large current to the output via the transistor 11, and at the same time, it is possible to prevent the inductor 4 from reaching the magnetic saturation.

Embodiment 2

A step-down converter of Embodiment 2 of the present invention will be described below.

Figure 3:
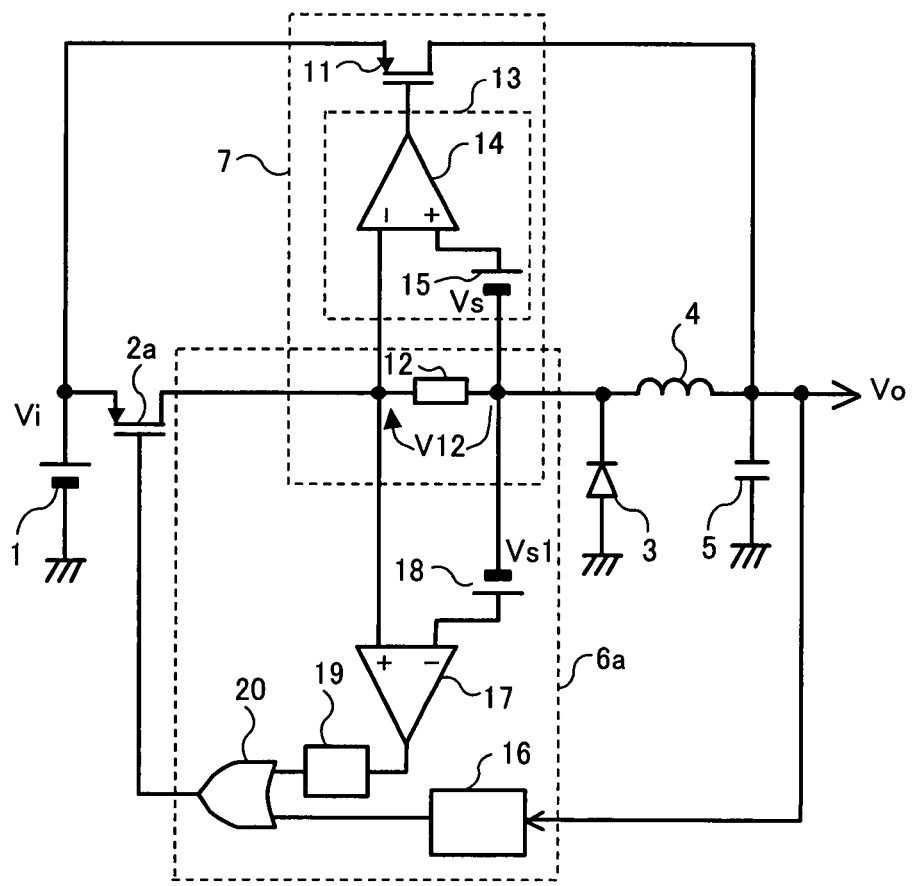
FIG. 3 is a diagram illustrating a circuit configuration of a step-down converter of Embodiment 2 of the present invention.
Figure 4:
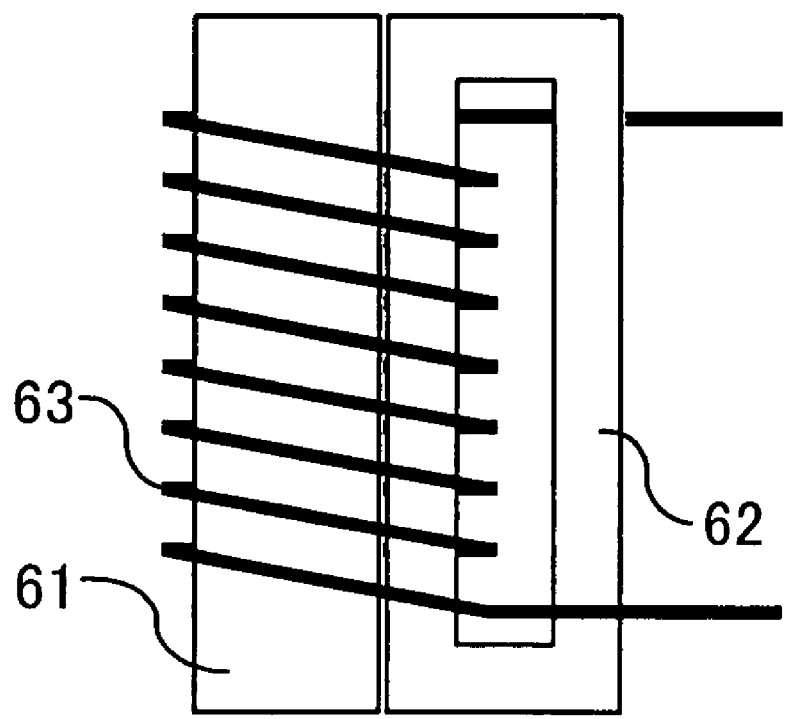
FIG. 4 is a cross section illustrating a side face of an inductor of a conventional example.

FIG. 3 is a diagram illustrating a circuit configuration of the step-down converter of Embodiment 2 of the present invention. Note that, in the step-down converter of Embodiment 2 of the present invention shown in FIG. 3, components corresponding to those in the step-down converter of Embodiment 1 of FIG. 1 have the similar function to those of Embodiment 1 and are given the same symbols as those of FIG. 1. Configurations and operations of these components will not be described repeatedly below.

As shown in FIG. 3, the step-down converter of Embodiment 2 of the present invention is different from the step-down converter of Embodiment 1 of the present invention of FIG. 1 in that the step-down converter of Embodiment 2 includes a switch 2a which is formed by a PMOS transistor and a control circuit 6a whose circuit configuration is different from that of the control circuit 6 of FIG. 1.

The control circuit 6a includes: a PWM circuit 16 which outputs a drive pulse having an adjusted duty ratio δ to detect and stabilize the output voltage Vo; a comparator 17; a voltage source 18 which outputs a predetermined voltage Vs1; a timer circuit 19; and an OR circuit 20. Note that, the PWM circuit 16 has basic functions of the control circuit 6 of FIG. 1.

In the control circuit 6a, the comparator 17 compares the detection voltage V12 of the detection resistor 12 with the predetermined voltage Vs1 and outputs a result of the comparison. On reception of an H level signal from the comparator 17, the timer circuit 19 outputs a signal which is at the H level for a predetermined period. The OR circuit 20 outputs a logical sum of an output from the PWM circuit 16 and an output from the timer circuit 19 as a driving signal for the switch 2a.

A description will be provided of operation of the step-down converter having the above-mentioned configuration of Embodiment 2 of the present invention.

When the step-down converter is in normal operation in which the output current Io is not too large, the detection voltage V12 of the detection resistor 12 does not reach the predetermined voltage Vs1. Therefore, an output of the comparator 17 is at an L level, and thus the output of the timer circuit 19 is also at the L level. For this reason, the output from the OR circuit 20 equals with the output from the PWM circuit 16. Therefore, in the normal operation, the step-down converter of Embodiment 2 operates in the same manner as the step-down converter of Embodiment 1 of the present invention described above.

Meanwhile, in operation in a case where a load temporarily and suddenly increases for any cause, that is, in a case where the output current Io increases, an inductor current increases with an increase in the output current Io, so that the detection voltage V12 of the detection resistor 12 reaches the threshold voltage value Vs1. At this point, the output of the comparator 17 rises to an H level, and the timer circuit 19 outputs a signal which is at the H level for a predetermined period. The OR circuit 20 receives the signal which is at the H level for the predetermined period and keeps the switch 2a in the OFF state for the predetermined period. In this way, the control circuit 6a of Embodiment 2 operates to share the detection resistor 12 with the current bypass circuit 7 and serves as an overcurrent protection circuit for protecting the step-down converter from an overcurrent.

The control circuit 6a shares the detection resistor 12 with the current bypass circuit 7. However, it is preferable that the predetermined voltages Vs1 and Vs which are compared with the detection voltage V12 of the detection resistor 12 are set to voltages at roughly the same level satisfying the relationship of Vs1>Vs. That is, at the time when the inductor current flowing through the switch 2a reaches the predetermined value due to the increased output current Io, the transistor 11 is turned on to conduct the bypass current. If the output current Io further increases, the ON period of the transistor 11 increases, which increases the bypass current I11. In this way, the inductor 4 is protected from the magnetic saturation. At the time when the increased inductor current reaches such a level that the output of the comparator 17 is inverted, the switch 2a is turned off to protect the switch 2a from the overcurrent. In this way, it is possible to supply a large current to the output and to protect the switch 2a from the overcurrent, and at the same time, it is possible to protect the inductor 4 from the magnetic saturation.

As described above, the present invention is applicable to, for example, a step-down power supply circuit for supplying a direct current voltage to various electronic apparatuses.

What is claimed is:

1. A step-down converter comprising:
   a switch to which an input voltage is supplied via an input terminal;
   an inductor which is connected to the switch;
   a rectifier which allows a current to flow through the inductor in the OFF state of the switch;
   a smoothing unit which smoothes the current of the inductor to produce an output voltage to an output terminal; and
   a current bypass circuit,
   wherein when the current flowing toward the inductor exceeds a predetermined value, the current bypass circuit forms a path through which part of the current which exceeds the predetermined value flows from the input terminal to the output terminal while bypassing the inductor.

2. A step-down converter of claim 1, wherein the current bypass circuit includes:
   a transistor which has one terminal connected to the input terminal and the other terminal connected to the output terminal, an operation current of the transistor being controlled by a control signal;
   a current detection circuit which detects a current flowing toward the switch or the inductor to output a current detection signal; and
   a control circuit which outputs a control signal to increase an operating current of the transistor when a signal level of the current detection signal reaches a predetermined level.

3. A step-down converter of claim 2, wherein the transistor is a PMOS transistor.

* * * * *